UNITED STATES PATENT OFFICE

RICHARD HERZ, OF FRANKFORT-ON-THE-MAIN, ERNST RUNNE, OF FRANKFORT-ON-THE-MAIN-HOCHST, AND EDUARD ALBRECHT, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

TRIHALOGEN ARYLTHIOGLYCOLIC ACIDS AND PROCESS OF MAKING SAME

No Drawing. Original application filed March 15, 1928, Serial No. 262,031, and in Germany March 18, 1927. Divided and this application filed February 13, 1930. Serial No. 428,238.

This application is a division of our application Serial No. 262,031, filed March 15, 1928.

We have found that by treating trihalogen benzene derivatives particularly those corresponding to the general formula:

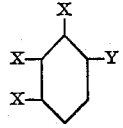

in which formula the X's mean halogen and Y means hydrogen or an alkylgroup, with chlorosulfonic acid, uniform sulfochlorides are formed. It is a surprising fact that this reaction produces uniform sulfochlorides as according to the behaviour of toluene the formation of several isomeric sulfochlorides was to be expected. These sulfochlorides are reduced to the corresponding mercaptane compounds and yield by condensing the latter with monochloracetic acid trihalogenarylthioglycolic acids of the general formula:

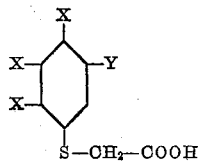

wherein X and Y have the aforesaid signification.

Our present process is more economical and yields the desired products in a purer state than the hitherto generally applied process starting from the corresponding amino-compounds and subjecting them to the so called Leukard's reaction.

The trihalogenarylthioglycolic acid, obtained according to our process, are new compounds and represent valuable intermediates for the production of dyestuffs of the thioindigo series.

In order to further illustrate our invention, the following examples are given, the parts being by weight and all temperatures in centigrade degrees. We wish it however to be understood that we are not limited to the particular products nor reaction conditions mentioned therein.

Example 1

(a) Production of 1.2.3-trichlorobenzene-4-sulfochloride of the formula:

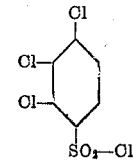

182 parts of 1.2.2-trichlorobenzene of the melting point 53–54° (cf. Beilstein, 4th edition, vol. 5, page 203) are introduced at 20–30° into 750 parts of chlorosulfonic acid. The mixture is slowly heated to about 70° and kept at this temperature for about 2 hours while stirring. When cold the mass is poured on ice, the separated sulfochloride is filtered off and directly used for the further process. This new compound melts in a pure state at about 65–66°.

(b) Production of 1.2.3-trichlorobenzene-4-mercaptane of the formula

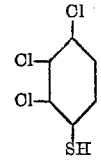

Into a suitable apparatus fitted with a stirrer, a condenser and a steam injector at about 50° a mixture of 400 parts of sulfuric acid of 95% and 100 parts of ice is introduced, then the quantity of the sulfor-chloride obtained according to (a) and 350 parts of zinc dust are slowly added, the vessel is closed, then the temperature is slowly increased to 100° and steam is injected during the whole process of reaction. The new 1.2.3-trichlorobenzene-4-mercaptane passes over.

(c) Production of 1.2.3-trichlo-benzene-4-thioglycolic acid of the formula:

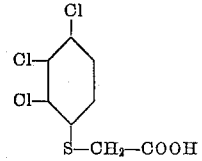

The mercaptane compound described sub (b) is dissolved at about 40° in 520 parts of a caustic soda solution of 33° Bé. and 3000 parts of water and mixed with 100 parts of mono-chloro-acetic acid. Then the mass is stirred at about 50° for an hour. After cooling down the precipitated sodium salt of the formed 1.2.3-trichloro-benzene-4-thioglycolic acid is filtered off. By acidifying the free acid may be obtained therefrom as white needles of the melting point 149°.

*Example 2*

When starting from 196 parts of 2.3.4-trichloro-toluene of the melting point 41°, described in Beilstein, edition 4, vol. 5, page 298, and working otherwise according to Example 1, the new 1-methyl-2.3.4-trichloro-benzene-5-thioglycolic acid is obtained. It corresponds probably to the formula:

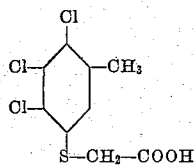

It melts at about 157-161°.

We claim:

1. A process for manufacturing phenyl-thioglycolic acids of the general formula:

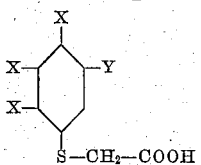

in which formula the X's mean halogen and Y means hydrogen or an alkyl group which process comprises treating halogen-benzenes of the general formula:

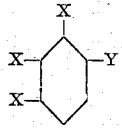

in which formula the X's and Y have the aforesaid signification, with chlorosulfonic acid at a temperature below 100° C., reducing the sulfochlorides thus formed to the corresponding mercaptane compounds and condensing the latter with monochloroacetic acid.

2. As new compounds products corresponding probably to the general formula:

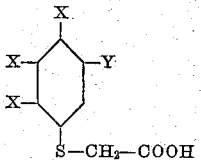

in which formula the X's mean chlorine and Y means hydrogen or an alkyl group, being crystalline powders, insoluble in alkalis which can be condensed to the corresponding oxythionaphthene-derivatives.

3. As a new product 1.2.3-trichlorobenzene-4-thioglycolic acid of the formula:

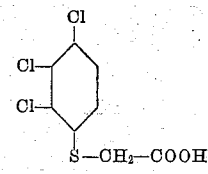

being when dry a white crystalline powder melting at about 149°, insoluble in water, soluble in alkalis which can be condensed to trichloro-oxythionaphthene.

In testimony whereof we affix our signatures.

RICHARD HERZ.
ERNST RUNNE.
EDUARD ALBRECHT.